J. B. SKINNER.
Gang Plow.
No. 48,846.
Patented July 18, 1865.
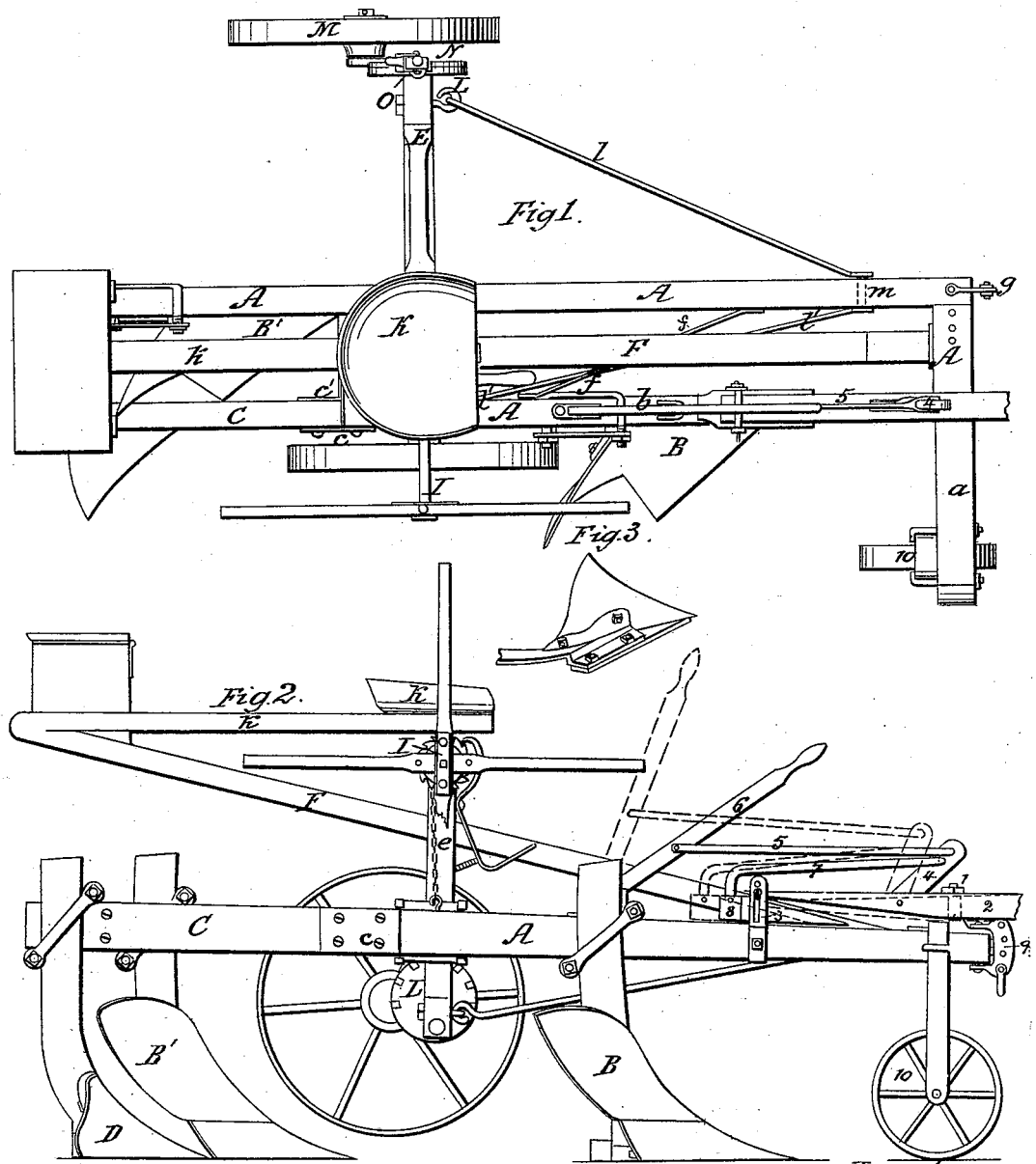

UNITED STATES PATENT OFFICE.

JAMES B. SKINNER, OF ROCKFORD, ILLINOIS.

IMPROVEMENT IN GANG-PLOWS.

Specification forming part of Letters Patent No. 48,846, dated July 18, 1865.

*To all whom it may concern:*

Be it known that I, JAMES B. SKINNER, of the city of Rockford, in the county of Winnebago and State of Illinois, have invented certain new and useful Improvements in Gang-Plows; and I do hereby declare that the following is a full, clear, and exact description of the construction and operation of the same, reference being had to the annexed drawings, making a part of this specification, and in which—

Figure 1 represents a plan view of my gangplow; Fig. 2, a longitudinal elevation of the same; and Fig. 3 a bottom view, showing the mode of attaching the mold-board to the share.

It is the object of my invention so to construct the gang-plow, consisting of a rigid frame and carrying-axle and an independent driver's seat, as to give the driver perfect control over devices for equalizing the work of each plow, for rendering the tongue rigid or flexible, for regulating the depth of furrow, and for keeping the axle in a uniform plane, and, moreover, enable me to use four horses abreast and guide the plow so as to make parallel furrows; and to this end my invention consists, first, in arranging the plows before and behind an adjustable axle, and on a rigid frame adjustable upon the axle, to equalize the draft and render the work of each plow uniform; second, in attaching the tongue to the main frame, so that it can be rendered rigid or flexible at the will of the driver to regulate the position of the plows at pleasure; third, in so combining a clevis with the main frame and tongue as to attach an auxiliary team and distribute the draft so equally that each horse shall do an equal share of the work; fourth, in connecting the outer wheel with the axle by a crank for the purpose of raising or lowering one end of the axle to keep it parallel to the ground; fifth, in arranging a gage-wheel forward of the plows and at such a distance to the right of their path as to cause it to run in the furrow of the rear plow in its previous round to insure a perfect parallelism of the furrows; sixth, in raising and lowering the main frame on the axle perpendicularly to control the depth of plowing, or raise the plows out of the ground at pleasure; seventh, in combining draft-rods which connect the axle and main frame with a hinged reach and windlass-standard to support the main frame in the desired relation to the axle or to the depth of plowing.

In the accompanying drawings the machine is shown as mainly composed of a rigid frame, A, consisting of two side and two end pieces of suitable strength, made of a rectangular form, and with sufficient width between the side pieces to receive standards, and a reach-piece receives and holds the plows B B′ firmly in such fixed relation to the work to be done as may be required, the plow B being placed on the right side of the frame in front of the axle E and of the right wheel, and B′ on the left side of the frame in rear of the axle and between the wheels. By this arrangement the plows are brought close to the team, are under the direct control of the driver, and can be instantly graduated to any depth of furrow. The weight of the plows and the land upon them is chiefly borne by the carrying-wheels, and in turning or going from field to field the plows can be held entirely above the ground.

On the right side piece and front cross-piece of the frame A a bolt secured in a metallic slot, 1, receives the tongue 2, which has a slot that gives it a free vertical movement, while the rear of the tongue moves between straps 3, carrying slots that receive the end of a guide-belt attached to the tongue, and permits it to have a slight lateral movement.

Upon the rear of the tongue, between the bolt 1 and straps 3, a short lever, 4, is hinged, and from the top of this lever a link-bar, 5, passes to a hand-lever, b, pivoted to the frame near the driver's seat. From the lever 4 a bar, 7, passing back of the rear end of the tongue, is bent down and rigidly secured to a wedge, s, that slides between the tongue and the main frame. Thus the driver by moving the hand-lever 6 forward can force the rear of the tongue to the top of the slots in the straps 3 and render the tongue rigid with the main frame; or by drawing back lever 6, as shown in red lines in Fig. 2, he can permit the tongue any desired degree of flexibility the condition of the plows or the team may require to enable either to work to the best advantage.

To the left of the front cross-piece holes are bored to secure a clevis-pin to support the clevis 9, that an auxiliary team may be attached to the gang-plow, when necessary, in such position that the outside horse shall follow the opened furrow and the others travel upon the unplowed land; and it is obvious that by giving the clevis the proper relation to the tongue the draft may be equally divided between three or four horses when working abreast, and so as to tend to elevate or depress the plow.

In order to strengthen the frame so as to bear the draft of the auxiliary team a cross brace-rod, $f$, is passed from the inside of the left frame-piece to the inside of the right frame-piece and securely bolted to each.

On the right of the front cross-piece a gage-wheel, 10, is secured by parallel straps united at the top and supporting the axle of the wheel at the bottom. These straps are secured to the frame by bolt-hooks, that are drawn tight when the plow is in motion and released when it becomes necessary to adjust the wheel to a varied depth of plowing. It is obvious that as this wheel will run in the last furrow made by the outside plow on the previous round it will necessarily secure the almost perfect parallelism of the forrows, and as the tendency of the plows is uniformly to the lowest lines the frame will permit them to reach the gage-wheel will give a uniform depth of furrow. It is also obvious that by thus arranging the gage-wheel it can run on the land beyond the furrow when desired.

To employ a subsoil-plow with one or more of the gang-plows a short auxiliary frame, C, is attached to the right side piece of the main frame A by suitable plates, $c\ c'$, strongly bolted in place, and with a rear end piece fastened to the left side piece of the main frame. On the rear extended end of the auxiliary frame C, and in line with the plow B, I secure the subsoil-plow D, of any desirable form, and set to any depth of furrow desired. Of course, if the draft now becomes inconvenient the left-hand plow may be raised out of the ground or removed from the main frame, and when desirable to form trenches the plow B' may be substituted for the subsoil-plow, and set at any depth desired in the furrow of the front plow, B. The gang-plow thus arranged requires that the main frame A, with its previously-described attachments, should be capable of a movement to and from the supporting-axle, and this is effected in the following manner: Two upright standards, $e$, are firmly secured to the axle E, so that the inner edges of the side timbers of the main frame will move easily up and down on the outside edges of the standards, while a reach, F, which is hinged to the main frame, passes between the standards above the highest point to which the frame will be required to be raised, and is secured to the standards by a screw-bolt that passes through the reach and both standards.

The object of attaching the reach to the top of the standards is that it may, in connection with the draft-rods, hold the standards perpendicular when the plows are raised and lowered. I am aware that they might be held nearly perpendicular by sliding between guides fastened upon the frame-timbers at the point where the upper rollers are shown in the drawings, and I intend to so use them when desirable.

The standards carry a windlass-bar, I, carrying a ratchet-wheel and arms convenient to the driver's seat K, which is supported on a spring-bar, $k$, secured to the projecting end of the reach. The windlass-bar carries pulleys on the outside of and near to the standards, and one of the standards carries a pawl to catch in a ratchet-wheel on the windlass-bar and prevent it from turning in but one direction.

Chains or cords are attached at one end to the pulleys and at the other to the frame, and friction-rollers may be attached to the frame to render its movements in a vertical line more easy. Now when it is desired to raise the plow out of the ground to go "afield" or turn a corner the driver moves the hand-lever 6 forward to render the tongue rigid and turns the windlass-bar until the chains are wound up to raise the frame to the height desired, and then the principal weight of the gang-plow rests on the axle E, and the tongue supports the forward portion of the frame on the horses' necks; and when the plows are at work the pawl is released from the ratchet-wheel and the windlass-bar is turned back until the desired depth of furrow is attained.

To hold the axle and frame in their proper relation I combine with the reach-bar and its front hinged connection with the frame and its rear connection with the standards two draft-rods, $l\ l'$, the former attached at one end to a bolt, $m$, in the front of the left side piece of the frame and at the other to the outer left end of the axle E, while the latter proceeds from the bolt $m$ on the inside of the left side piece of the frame to the axle near its outer right end. The attachments of the rods to the axle and bolt $m$ are such as to present no rigid obstruction to the vertical movement of the frame to and from the axle.

With all these devices the perfect operation of the gang-plow requires some device for preserving the parallelism of the frame to the ground, and this I effect in the following manner: On the left end of the main axle E, I bolt a circular plate, L, with detents in its outer perimeter, and to the center of this a round plate or disk, N, of the same diameter, is pivoted. On one edge of the plate N a stud is received for the wheel M to roll on as its axle-journal. A lever, O, is also attached to the plate N, which carries a bolt-catch that is kept by a spiral spring in one of the detents of the wheel L, and is drawn out of the detent by a rod which passes and is attached to a thumb-lever on the lever O, and thus a crank or eccentric axle is made to take the place of the usual axle-journal for the left wheel of my gang-plow. Now where the lever O is turned by the driver it is manifest that the wheel M may be caused to run on any desired plane within the range of the crank-axle, so that while the right wheel runs in a furrow of the front plow the left, by depressing the axle, may run on the land without disturbing the parallelism of the axle to the surface below the wheels, and this capability is at all times conveniently within the control of the driver.

To diminish the friction of the land against the plow-standards and render the work of the gang-plow light I have placed the standards for the support of the mold-board and the attachment of the plow to the frame some distance to the right of the landside and nearly central with the mold-board, which also serves to equalize the strain upon the mold-board and prevent any tending to twist the standard.

To prevent the mold-board and point from raising above the level with the share I weld a piece of steel of the proper size upon the mold-board at the point and extend it forward until it will lock under the share at the point of intersection with the landside.

What I claim as my invention, and desire to secure by Letters Patent, is—

1. The combination, in a gang-plow, of one or more plows before and one or more plows behind the supporting-axle, where the plows are firmly attached to a rigid frame, which is itself adjustable upon and in relation to the axle, substantially as set forth.

2. The combination of the tongue with the main frame by a hinge and lock, substantially as described, to render it rigid or flexible at the will of the driver.

3. The combination of a clevis with the main frame of a gang-plow and the tongue, whether rigid or flexible, substantially as described, to work three or more horses abreast and equalize the draft between them.

4. The attachment of the left supporting-wheel of a gang-plow to a crank-axle to preserve the desired parallelism of the axle to the ground, substantially in the manner set forth.

5. The combination of an adjustable gage-wheel with the rigid main frame of a gang-plow, when arranged forward of the plow, substantially as and for the purpose set forth.

6. The combination, in a gang-plow, of a rigid main frame and an adjustable axle, with a mechanism for raising and lowering the frame, substantially in the manner described, for the purpose set forth.

7. The combination of the main frame, the axle, the standards by the draft-rod, and reach or guides, substantially in the manner described, for the purpose set forth.

In testimony whereof I have hereunto subscribed my name.

JAMES B. SKINNER.

Witnesses:
  HENRY M. SKINNER,
  O. DICKERMAN.